United States Patent Office 2,881,076
Patented Apr. 7, 1959

2,881,076

PROTEINACEOUS SOY COMPOSITION AND METHOD OF PREPARING

Louis Sair, Evergreen Park, Ill., assignor to The Griffith Laboratories, Inc., Chicago, Ill., a corporation of Illinois No Drawing. Application September 22, 1958
Serial No. 762,272

9 Claims. (Cl. 99—14)

The present invention relates to the preparation of an edible vegetable protein composition particularly useful for treating meats. It has particular reference to the conversion of defatted soybean material into a glycinin-base protein composition useful in the preparation of fresh and cured whole meat and cominuted meat products.

Soybean flour has been used heretofore in the preparation of ground meat products, as a fat emulsifier and water-binding agent. To secure these functions, so much of the flour is required that the soy flavor is too pronounced. Because of the undesired soy flavor, use of such flour as an emulsifier has been substantially discontinued, and other materials are now used for the purpose.

The principal protein of soybean is called glycinin, and it is the glycinin content which is the active agent in processing meat. Glycinin is not a definite compound, and it is in part defined in terms of its analytical content of amino acids, such as arginine, leucine, lysine, and others. The molecules vary in length, and may be refered to, relatively, as the short-chain glycinins and the long-chain glycinins, it being understod that the native glycinin is a mixture of molecules varying in length relatively from short to long. The longer the chain, the better the emulsifying and water-binding qualities.

The native shorter-chain glycinins are insoluble in water at a pH in the range of the isoelectric point, that is, pH 4.2 to 4.6, and soluble at pH in the range from 6 to 10.5. The native longer-chain glycinins, which comprise approximately 25% of the total soy protein, are largely insoluble at pH in the range from 6 to 10.5. When glycinin is rendered soluble by raising the pH upwardly from 6, and, when sodium base alkalies are used, the solubilized glycinin may be termed "sodium glycininate." However, for the purposes for which the protein of the present invention is intended to be used, it may be slightly altered by alkali, or acid, or heat, or by mild bleaching, and hence, these forms are herein referred to as "glycinin-base protein."

The conventional process to prepare glycinin substantially free from fiber, carbohydrates, taste ingredients and other proteins, is extracting defatted soybean material with water at pH in the range from 6 to 10.5, separating solids from liquid, then precipitating glycinin at pH of 4.2 to 4.6 by acid, washing the precipitate, and then drying. The original water extract contains soy solubles other than glycinin, and these are substantially all soluble in the presence of the precipitated glycinin upon acidification, so as to be separated from the glycinin, as by decantation and washing. The result is a yield of about 30% of the soy material as glycinin, which is the shorter-chain components of the native glycinin. The longer-chain components, which are the better emulsifiers, are left in the residue of the original extraction.

The present invention aims to concentrate from defatted soybean material more of the glycinin content, including longer-chain components, in a protein composition free from the undesired taste of soybean.

It is the principal object of this invention to produce an improved low-cost efficient bland emulsifier for fat in ground meat products.

It is a particular object to prepare from such soybean material a glycinin-base protein especially suitable in meat processing for emulsification of fat and for water binding.

Various other and ancillary objects and advantages of the invention will appear from the following description and explanation of the inevntion.

After the extraction of oil from soybean, there is left defatted soybean material, commonly as flakes, but also as flour, which is a common article of commerce. The present invention contemplates insolubilizing the native glycinin of the bean in an aqueous suspension of defatted soybean material by adding an acidic substance to reduce the pH to the vicinity of the isoelectric pH of the glycinin content which lies in the approximate range of pH from 4.0 to 4.8, and commonly at pH of 4.4. Content other than glycinin is in solution, such as certain enzyme systems, ash, flavoring ingredients, and carbohydrates, such as saponin, sucrose, raffinose and stachyose. Accompanying the undissolved glycinin are the fibrous and pulpy constituents of the flour or flakes. Importantly, the bean-flavored substance is largely in solution, and thus can be easily removed from the desired protein by separating liquids and solids, and washing the solids with water.

The resulting solids predominate in glycinin, but contain fiber and pulp which may serve as useful filler for body in ground meat products. On the dry basis, the solids contain about 70% of the original defatted soybean flakes. Since the latter contain approximately 55% of protein, determined in the usual way by multiplying nitrogen content by the factor 6.25, it is apparent that the product obtained is not entirely protein but predominates in glycinin-base protein. Approximately 86% of the prctein content of defatted soybean material is water-insoluble at the isoelectric point of the original extraction. Accordingly, the dry product is approximately 68% protein.

The solids as a wet mass may be used in a ground meat formulation, by adjusting the meat formula for the added water. However, it is preferred to dry the solids to a powder form. The product, being insoluble at its isoelectric point, may be greatly improved in its efficiency as an emulsifier and water-binding agent by further processing.

Further processing comprises raising the pH of the resulting mass to a value in the range from 6 to 10.5 by adding an edible agent, such as alkaline materials or buffering compounds. Among them are sodium carbonate, sodium bicarbonate, sodium hydroxide, trisodium phosphate, disodium phosphate, sodium tripolyphosphate, sodium tetrapyrophosphate, and ammonia. Although I have referred more particularly to the sodium compounds, which are more available and useful commercially, it is to be understood that the agent is used in such small amount relative to the amount of meat, that the corresponding potassium and amonium compounds may be used in whole or in part.

Meat in process has a pH of about 5.7 to about 6.3, and by elevating the pH of the protein solids, there is formed a glycinin-base protein which is substantially all soluble or dispersible in a saline meat composition in process, either as solute or as colloid. Enough water may be present at said elevated pH so that the glycinin is substantially all dissolved or dispersed, fibrous material being in suspension. Such a fluid mass may be dried, as by spray-drying, to provide a powdery emulsifier.

The emulsifying properties may be further improved by heating the aqueous mass at a pH in the range upwardly from 6.0 for thirty minutes or more at a temperature, for example, in the range from 100° F. to 180° F. (38.7° to 82° C.), thus to render the protein more colloidal or gel-like, in which condition its emulsifying properties are enhanced, as described in my cofiled application Serial No. 587,482. After such a heat treatment, the suspension of solids may be dewatered to form a powder. The dry product may be used in compounding comminuted meat products.

In compounding comminuted meat products, numerous ingredients are employed. Among them, in addition to protein emulsifiers for fat, is a material known as dry syrup, as described in Komarik U.S. No. 2,634,211. Said solids are therein defined as a water-soluble hydrolysate of starch having a D.E. (dextrose equivalent) in the range from 24 to 55. It may be used in amounts in the range from 1 to 13 pounds per 100 pounds of meat. As the D.E. increases, the dried solids are increasingly hygroscopic.

I have found that the hygroscopicity may be minimized and substantially overcome by having present in the solution, which is spray-dried to provide the dry syrup, at least a small proportion of protein. The glycinin-base protein of the present invention, and especially an aqueously dispersed form of it at pH upwardly from 6.0, is a suitable protein.

Since the protein of the present invention is generally used in amount from 0.5 to 4 pounds per 100 pounds (5 to 40 grams per kilogram) of meat, and since the dry-syrup is generally used in amount from 1 to 13 pounds per 100 pounds (10 to 130 grams per kilogram) of meat, a suitable dry combination consisting of dry-syrup and the protein of the present invention useful for combining the two functions may have from 3.7% to 77% of the glycinin-base protein. The lower amount of the protein is preferably used when the D.E. of the dry syrup is in the higher range, and at least 10% may be used with solids of any D.E. in the range. A mixture of 40 parts of dry syrup solids and 60 parts of the acid-washed soy flour of Example 1 has excellent dry quality.

When a composition of the present invention having a solids content consisting of glycinin-base protein and the pH-adjusting agent is a single ingredient in a ground meat formulation, it is preferred that its pH be not over 7.5. However, when the glycinin-base protein composition of the present invention is present with certain other ingredients, for example as a vehicle, or as a component of a more functional composition, it may be important that the whole composition have a pH higher than 7.5. For example, in my prior application Serial No. 425,725, filed April 26, 1954, now U.S. Patent No. 2,828,212, issued March 25, 1958, I have disclosed solid curing salt compositions for meat containing both alkali metal nitrite and a sodium salt of an isomer of ascorbic acid. Such a solid composition in absorbing moisture from the atmosphere results in hydrolysis of the sodium ascorbate, thus effecting an acid condition which results in release of nitrous acid and loss of ascorbic value. Hence, to stabilize such a composition in its nitrite value as well as in its ascorbic value, a composition having such a combination requires a pH upwardly from 7.6 and it may be as high as 10.5. In consequence, an alkaline agent is used to effect a pH in the range from 7.6 to 10.5.

Therefore, it is possible to make a solid curing-salt composition including the glycinin-base protein composition of the present invention using an alkali content to impart a pH in the range from 7.6 to 10.5, thus to provide solubility for the glycinin-base protein and to stabilize the nitrite content and the ascorbic value. The following exemplifies:

Table I

| | Parts by weight |
|---|---|
| Granulated cane sugar | 3 lbs. (1362.0 grams). |
| Potassium nitrate | 4 ozs. (113.5 grams). |
| Potassium nitrite | 1 oz. (28.4 grams). |
| Sodium ascorbate | 0.5 oz. (14.2 grams). |
| Potassium carbonate | 5 ozs. (141.9 grams). |
| Glycinin-base protein at pH of 10.5 | 2 lbs. (908.0 grams). | pH (1% solution), 10.5.

The following Table II is a standardized frankfurter test formula for measuring the emulsifying properties of protein additives, in terms of fat rendering.

Table II

| | |
|---|---|
| Steer flanks (40% lean and 60% fat) | 100 lbs. (45,400 grams). |
| Chipped ice | 30 lbs. (13,620 grams). |
| Sodium chloride | 2.5 lbs. (1,135 grams). |
| Curing salt [1] | 4 ozs. (113 grams). |
| Seasoning | 12 ozs. (340 grams). |
| Protein emulsifier | $x$ lbs. ($x$ grams). |

[1] 90% NaCl, 4% $NaNO_3$ and 6% $NaNO_2$.

The ingredients are compounded in the silent cutter in the usual way, stuffed into casings and smoked at 120° F. to 165° F. (49° to 74° C.) for 2½ hours. After removal from the smokehouse, they are immersed in water at 160° F. (71° C.) for exactly 2 minutes. Then, after draining, they are immersed in tap water at 40° F. to 50° F. (4.44° to 15.6° C.) for 1 minute. The rendering of fat is observed after cold storage in a refrigerator. To the extent fat is rendered the chilled fat is observed on the outside of the casing as a light-colored coating or as spots.

Experience shows that when the value of $x$ in the formula is 2 lbs. (908 grams) and there is no decrease in rendering of fat, over a control wherein $x=0$, the emulsifier is a poor one. When $x=2$ lbs. (908 grams) and there is no rendering of fat, the emulsifier is an excellent one. Table III shows the results using several protein emulsifiers.

Table III

| Item | Agent | $x$ lbs. in Table II | Observation FR=fat rendering |
|---|---|---|---|
| 1 | Control | 0 | Much FR. |
| 2 | Sodium caseinate | 2 (908 gm.) | Do. |
| 3 | Sodium glycinin-base-protein.[1] | 1 (454 gm.) | Slight FR. |
| 4 | ......do.[1] | 2 (908 gm.) | No FR. |
| 5 | Glycinin [2] | 2 (908 gm.) | Some FR.[3] |
| 6 | Commercial defatted soy flour. | 4 (1,816 gm.) | FR as in item (3). |
| 7 | Protein of Example 1 | 2 (908 gm.) | No FR. |
| 8 | Roll-dried milk solids | 2 (908 gm.) | Much FR. |
| 9 | ......do | 4 (1,816 gm.) | Do. |

[1] Glycinin curd extracted at 140° F. (60° C.), and precipitated at its isoelectric point, then solubilized to pH of 7.3, and spray-dried.
[2] Glycinin curd extracted at 140° F. (60° C.) then precipitated and dried at its pH of 4.2.
[3] but less than in item (2).

For convenience, the protein of Example 1 is referred to as acid-washed soy (defatted flour or flakes). It contains about 70% protein and is equivalent in function to the sodium glycininate (item 4) which has about 85% protein, and it is much superior to an equal amount of sodium caseinate.

The following Example 1 illustrates the process:

Sulfur dioxide is injected into 430 pounds (195 liters) of water heated to 105° F. (40.4° C.) until a pH of 4.2 is reached. Then 12 pounds (5.45 kilograms) of defatted soybean material and sulfur dioxide are simultaneously introduced so as to maintain a pH within the range 4.0 to 4.8. Then 24 pounds (10.9 kilograms) more of the soybean material are added and hydrochloric acid rather than sulfur dioxide is used to maintain a pH between 4.0 and 4.5. The slurry is agitated for 1½ hours. After settling for 6 hours the supernatant liquid is decanted leaving an insoluble slurry which is then washed with one-half fold volume of water. The final solids in the slurry is 14.3% and the yield of solids based on original soybean material is 70.2%. The material is then dewatered to a dry powder. The temperature of the extraction may vary in the range from 75° F. to 120° F. (23.9° to 49° C.).

Other acid, such as hydrochloric acid, may be used instead of sulfur dioxide, the latter functioning to a certain extent as a bleach. Other mild bleaching agents may be used, if desired, to reduce coloring ingredients, such as carotene.

The dry powder and the original soy flour analyzed as follows:

Table IV

|  | Dried solids, percent | Soy flour, percent |
|---|---|---|
| Moisture | 4.4 | 7.5 |
| Ash | 2.0 | 6.2 |
| Protein | 70.0 | 55.0 |

Because of the complex nature of protein and the slight molecular modifications which may take place with heat and change of pH, aside from the natural variations in the soybean itself, it is quite impossible to define the product except in terms of the processing to produce it. In the accompanying claims, both the process and the product are claimed in the various degrees of processing suitable for producing useful protein compositions for treating meat products.

*Example 2.*—Into 1400 gallons (5300 liters) of cold water at 55° to 60° F. (12.8° to 15.6° C.) are slurried 1100 lbs. (500 kilograms) of defatted soy flour in a stainless steel tank 22 feet (6.7 meters) long, 5 feet (1.5 meters) wide and 22 inches (56 cm.) deep. To this are added 66 lbs. (30 kilograms) of hydrochloric acid (37% by weight). After agitating for one hour the mass is allowed to settle, and in about 8 hours it settles to the one-fourth level. The supernatant liquid is decanted, and replaced with the same quantity of said cold water in which the slurry is again agitated and allowed to settle for 10 hours before a second decantation. The solids are similarly washed once more and allowed to settle for 8 hours, followed by the third decantation. The thrice washed material provides a curd containing 12% to 15% solids. The curd is an isoelectric residue and it may be dried for certain uses, or further treated as follows:

To each 500 gallons (1890 liters) of the curd raised in temperature to 110° to 120° F. (43° to 49° C.) is slowly added an aqueous solution of caustic soda requiring about 12 to 14 lbs. (5.5 to 6.4 kilograms) of NaOH to raise the pH to a value in the range from 6.7 to 7.1. The resulting sodium proteinate may be dried without further processing. However, to improve its properties for certain uses and to facilitate spray-drying, it is further processed as follows:

The slurry of sodium proteinate is heated to 140° F. (60° C.) until a translucent viscous fluid is formed taking about 30 minutes. From the heated vessel containing the viscous fluid, the latter is drawn and spray-dried to form a readily soluble sodium proteinate. When a light color in the final product is desired about 10 pounds (4.54 kilograms) of an aqueous solution of hydrogen peroxide (50% strength) is added to the fluid before spray-drying and while it is at a temperature of about 140° F. (60° C.).

The yield of dried product is about 70% of the original soy flour and it contains about 3.6% of lysine, as a component of the protein. The product analyzes as follows:

Percent by weight
Moisture --- 3.3
Protein --- 68.0
Reducing sugar[1] --- 0.96
Ash --- 5.7
Fat --- 0.1
pH=7.1[2]

[1] Calculated as anhydrous dextrose.
[2] 5 parts dispersed in 95 parts of water.

*Example 3.*—The procedure of Example 2 is followed using high-fat soy flour, rather than defatted soy flour. In adding caustic soda the pH is raised only to 6.8. The following analyses illustrate the change in composition by the processing of this invention.

|  | High fat soy flour | Sodium proteinate |
|---|---|---|
| Moisture | 5.6 | 8.2 |
| Protein | 42.2 | 61.5 |
| Fat | 14.5 | 12.1 |
| Total ash | 5.4 | 4.1 |

In practicing the invention in accordance with the foregoing examples, the beany flavor is substantially all removed and a bland taste produced. The protein content of the original soy is increased. If desired, the oil may be extracted from the dry product of Example 3, leaving a protein composition substantially the same as that from Example 2. Where the oil is not so removed, it may function as part of the formula fat when used in making bread.

Heretofore, bread has been supplemented by including about 0.25% of lysine, added as a refined ingredient. By using 8% of the dried curd of the isoelectric residue or the water extract, or the wet or dried forms of the sodium proteinate to a finished bread, there is present about 0.28% of lysine. Bread ordinarily contains 8% to 10% of protein so that the product of the present invention plus the protein of the flour may constitute all the protein of the dough.

The protein has uses as a food supplement in cereals and other fields.

The present application is a continuation-in-part of my copending application Serial No. 587,500, filed May 28, 1956, now abandoned.

I claim:

1. In the production of dry soybean material the steps comprising subjecting soybean material containing natural water-soluble ingredients to the dissolving action of water at a pH in the vicinity of the isoelectric pH of the glycinin content of said material, separating solids from the resulting solution, removing substantially all of the beany-taste ingredients from resulting solids by washing with water, and drying the solids content whereby to provide a high-yield soy product.

2. In the production of dry soybean material the steps comprising subjecting soybean material containing natural water-soluble ingredients to the dissolving action of water at a pH in the vicinity of the isoelectric pH of the glycinin content of said material, separating solids from the resulting solution, removing substantially all of the beany-taste ingredients from the resulting solids by washing with water, and drying the resulting solids, whereby to provide a high-yield soy product.

3. In the production of dry soybean material the steps comprising subjecting soybean material containing natural water-soluble ingredients to the dissolving action of water at a pH in the vicinity of the isoelectric pH of the glycinin content of said material, separating solids from the resulting solution, removing substantially all of the beany-taste ingredients from the resulting solids by washing with water, elevating the pH of the resulting solids to a value not over 10.5 by adding an edible agent selected from the group consisting of edible inorganic alkalies and edible inorganic buffering agents, and drying the resulting solids.

4. The process of treating soybean material which comprises treating the material with water at the isoelectric point of the protein content, removing the resulting solution from the solids, removing substantially all the beany-taste ingredients from the resulting solids by washing with water, suspending the resulting solids in water at a pH of at least 6 and converting the suspension into a viscous liquid by heating, and drying the solids content.

5. The method comprising subjecting defatted soy material to the extracting action of water having a pH in the vicinity of the isoelectric pH of the glycinin content which lies in the approximate range of pH from 4.0 to 4.8, separating the resulting solution from insoluble content, removing substantially all of the beany-taste ingredients by washing the resulting solids with water, and drying the resulting composition.

6. The method comprising subjecting defatted soy material to the extracting action of water having a pH in the vicinity of the isoelectric pH of the glycinin content which lies in the approximate range of pH from 4.0 to 4.8, separating the resulting solution from insoluble content, removing substantially all of the beany-taste ingredients by washing the resulting solids with water, adding an edible pH-raising agent to the solids to elevate the pH of the solids to a value in the range from 6 to 10.5, said edible agent being selected from the group consisting of edible inorganic alkalies and edible inorganic buffering agents, and drying the resulting composition.

7. The method comprising subjecting defatted soy material to the extracting action of water having a pH in the vicinity of the isoelectric pH of the glycinin content which lies in the approximate range of pH from 4.0 to 4.8, separating the resulting solution from insoluble content, removing substantially all of the beany-taste ingredients by washing the resulting solids with water, adding an edible pH-raising agent to the solids to elevate the pH of the solids to a value in the range from 6 to 10.5, suspending the solids in water and rendering the resulting suspended solids dispersible and the suspension a translucent viscous liquid by heating to a temperature of at least 100° F., and drying the resulting composition.

8. A dry, uniformly palatable product comprising essentially that portion of defatted soybean meal which is insoluble in water at a pH in the range from 4.0 to 4.8, including the fibrous and raw protein elements, and is free of beany flavor.

9. A dry composition consisting essentially of: a dry, uniformly palatable product comprising essentially that portion of defatted soybean meal which is insoluble in water at a pH in the range from 4.0 to 4.8, including the fibrous and raw protein elements, and is free of beany flavor; and an edible agent in quantity to elevate the pH into a range of 6.0 to 10.5, said edible agent being selected from the group consisting of edible inorganic alkalies and edible inorganic buffering agents.

References Cited in the file of this patent

UNITED STATES PATENTS

| | | |
|---|---|---|
| 1,735,356 | Neff | Nov. 12, 1929 |
| 1,955,375 | Cone et al. | Apr. 17, 1942 |
| 2,284,700 | Wahlfross | June 2, 1942 |
| 2,634,211 | Komarik | Apr. 7, 1953 |

FOREIGN PATENTS

| | | |
|---|---|---|
| 746,859 | Great Britain | Mar. 21, 1956 |

OTHER REFERENCES

"Soybeans and Soybean Products," by Markley, vol. II, Interscience Publishers, Inc., New York, 1951, pp. 954, 967, 968, 985 and 986.

UNITED STATES PATENT OFFICE
CERTIFICATE OF CORRECTION

Patent No. 2,881,076                                             April 7, 1959

Louis Sair

It is hereby certified that error appears in the printed specification of the above numbered patent requiring correction and that the said Letters Patent should read as corrected below.

Column 3, line 57, for "higher than 75." read -- higher than 7.5. --.

Signed and sealed this 4th day of August 1959.

(SEAL)
Attest:

KARL H. AXLINE
Attesting Officer

ROBERT C. WATSON
Commissioner of Patents